United States Patent
Fujimoto

(10) Patent No.: US 8,472,144 B2
(45) Date of Patent: Jun. 25, 2013

(54) MAGNETIC HEAD SUSPENSION HAVING A LOAD BEAM PART WITH BENDING LINES

(75) Inventor: Yasuo Fujimoto, Kyoto-fu (JP)

(73) Assignee: Suncall Corporation, Kyoto-Fu (JP)

( * ) Notice: Subject to any disclaimer, the term of this patent is extended or adjusted under 35 U.S.C. 154(b) by 0 days.

(21) Appl. No.: 13/286,540

(22) Filed: Nov. 1, 2011

(65) Prior Publication Data

US 2012/0106005 A1    May 3, 2012

(30) Foreign Application Priority Data

Nov. 2, 2010  (JP) ................................ 2010-246221
Feb. 16, 2011  (JP) ................................ 2011-031083

(51) Int. Cl.
*G11B 5/60*    (2006.01)

(52) U.S. Cl.
USPC ........................................................ 360/244.9

(58) Field of Classification Search
USPC .......................................... 360/244.9, 245.2
See application file for complete search history.

(56) References Cited

U.S. PATENT DOCUMENTS

| | | | |
|---|---|---|---|
| 7,064,931 B2 * | 6/2006 | Hutchinson | 360/244.8 |
| 2006/0209465 A1 * | 9/2006 | Takikawa et al. | 360/244.9 |
| 2009/0279209 A1 * | 11/2009 | Fujimoto et al. | 360/234.6 |

FOREIGN PATENT DOCUMENTS

| | | |
|---|---|---|
| JP | 11-511284 | 9/1999 |
| JP | 2001-344919 | 12/2001 |
| JP | 2005-032393 | 2/2005 |
| JP | 2008-021374 | 1/2008 |
| JP | 2009-295261 | 12/2009 |

* cited by examiner

*Primary Examiner* — Craig A. Renner
(74) *Attorney, Agent, or Firm* — Sterne, Kessler, Goldstein & Fox P.L.L.C.

(57) ABSTRACT

A load beam part, which includes a plate-like main body portion facing a disk surface and paired flange portions bent from both side edges of the main body portion in a suspension width direction so as to extend toward a direction opposite from the disk surface, is bent at first and second bending lines in such a convex manner as to project in the direction toward the disk surface, the first bending line being positioned between the proximal end portion of the load beam part and the dimple in the suspension longitudinal direction and extending along the suspension width direction, the second bending line being positioned between the first bending line and the dimple in the suspension longitudinal direction and extending along the suspension width direction.

8 Claims, 19 Drawing Sheets

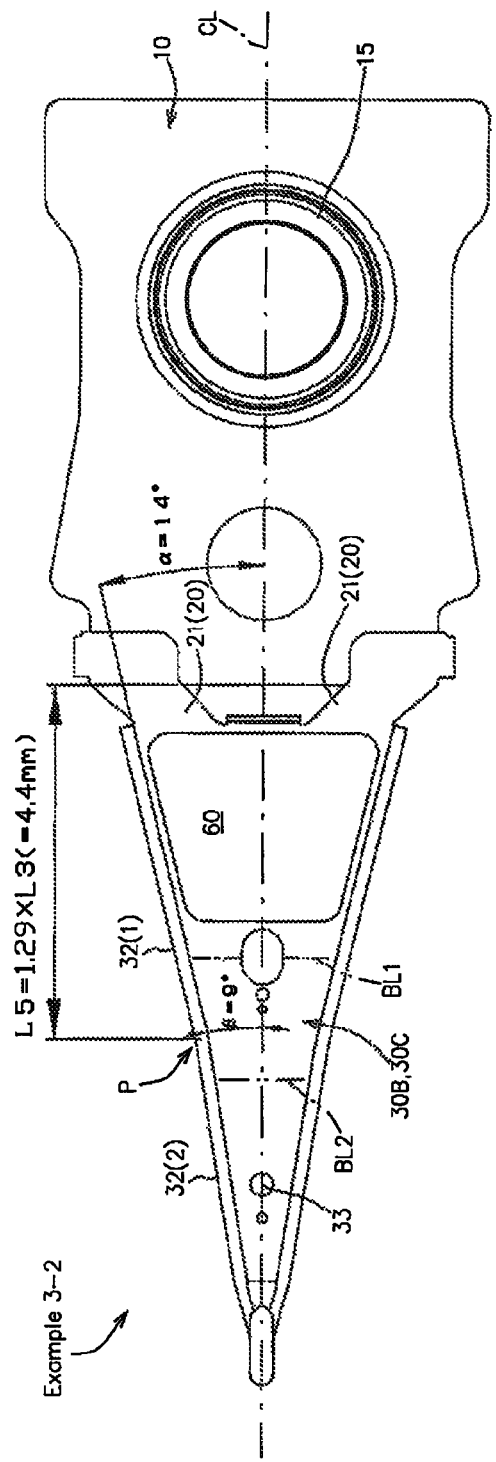

MAGNETIC HEAD SUSPENSION HAVING A LOAD BEAM PART WITH BENDING LINES

BACKGROUND OF THE INVENTION

1. Field of the Invention

The present invention relates to a magnetic head suspension for supporting a magnetic head slider that reads and/or writes data from and to a recording medium such as a hard disk drive.

2. Related Art

A magnetic head suspension that supports a magnetic head slider is required to accurately position the magnetic head slide to a center of a target track.

More specifically, the magnetic head suspension is directly or indirectly connected at a proximal side to an actuator such as a voice coil motor, and positions the magnetic head slider, which it supports at a distal side, to the center of the target track by being swung around a swing center by the actuator.

By the way, if the magnetic head suspension resonates at the time when being swung around the swing center, the magnetic head slider is largely displaced from the target track. In particular, out of the various vibration modes possibly generated in the magnetic head suspension, the first bending mode and the first torsion mode have the resonance frequencies within the low frequency range. It is therefore required to prevent or reduce the displacement of the magnetic head slider due to the vibrations of the first bending mode and the first torsion mode.

For example, there is proposed a magnetic head suspension with a load beam part that has a plate-like main body portion facing a disk surface and paired flange portions extending respectively from side edges of the main body portion in a direction away from the disk surface (see Japanese Unexamined Patent Publication Nos. 2005-032393, 2008-021374 and 2009-295261, which are hereinafter referred to as prior art documents 1-3).

Each of the magnetic head suspensions disclosed by the prior art documents 1-3 enhances the rigidity of the load beam part thanks to the paired flange portions, thereby increasing the resonant frequencies of the first torsion mode and the first bending mode to prevent occurrence of the resonant vibrations of the first torsion mode and the first bending mode as much as possible.

Furthermore, the prior art document 3 discloses that a displacement amount of the magnetic head slider in the seek direction at the time when the magnetic head suspension is vibrated can be adjusted by bending the load beam part with the paired flange portions at two positions including a proximal-side bending line and a distal-side bending line, both of which are along a suspension width direction.

However, in the magnetic head suspension disclosed by the prior art document 3, a bending direction at the proximal-side bending line and a bending direction at the distal-side bending line are different from each other. More specifically, the load beam part is bent in such a convex manner as to project in a direction away from the disk surface at one of the proximal-side bending line and the distal-side bending line, while the load beam part is bent in such a convex manner as to project in a direction toward the disk surface at the other one of the proximal-side bending line and the distal-side bending line.

Since the bending directions of the load beam part at the proximal-side bending line and the distal-side bending line are different from each other as explained above, there is a problem that a bending process of the load beam part is made difficult.

In particular, the paired flange portions are bent in the direction away from the disk surface as explained above. In a case where the load beam part with such flange portions is bent in such a convex manner as to project in the direction away from the disk surface at the bending line along the suspension width direction, there is also a problem that the flange portions are likely to be deformed.

Further, the prior art documents do not disclose a configuration for simultaneously minimizing both a displacement amount of the magnetic head slider due to the vibration of the first torsion mode and a displacement amount of the magnetic head slider due to the vibration of the first bending mode.

SUMMARY OF THE INVENTION

The present invention has been made in view of the above conventional art, and it is an object thereof to provide a magnetic head suspension with a load beam part including a plate-like main body portion that faces a disk surface and paired flange portions that are bent from both side edges of the main body portion in a suspension width direction so as to extend toward a direction opposite from the disk surface, the magnetic head suspension capable of reducing as much as possible displacement of a magnetic head slider due to vibrations of a first torsion mode and a first bending mode while being readily manufactured.

In order to achieve the object, the present invention provides a magnetic head suspension including a supporting part that is swung around a swing center in a seek direction parallel to a disk surface directly or indirectly by an actuator, a load bending part that is connected to the supporting part so as to generate a load for pressing a magnetic head slider toward the disk surface, a load beam part that is supported through the load bending part by the supporting part and transmits the load to the magnetic head slider, and a flexure part that is supported by the load beam part and the supporting part and has at a distal side a head-mounting region for supporting the magnetic head slider, wherein the load beam part includes a plate-like main body portion and paired flange portions, the main body portion facing the disk surface, the paired flange portions being bent from both side edges of the main body portion in a suspension width direction so as to extend toward a direction opposite from the disk surface, wherein the main body portion is provided with a dimple that protrudes in the direction toward the disk surface so as to come in contact with a reverse surface of the head-mounting region that is opposite from a supporting surface for supporting the magnetic head slider, and wherein the load beam part is bent at first and second bending lines in such a convex manner as to project in the direction toward the disk surface, the first bending line being positioned between the proximal end portion of the load beam part and the dimple in the suspension longitudinal direction and extending along the suspension width direction, the second bending line being positioned between the first bending line and the dimple in the suspension longitudinal direction and extending along the suspension width direction.

The magnetic head suspension according to the present invention makes it possible to reduce a displacement of the magnetic head slider due to a vibration of a first bending mode and a vibration of a first torsion mode without increasing bending angles at the first and second bending lines.

Further, in the magnetic head suspension according to the present invention, the paired flange portions are bent to form a convex shape protruding toward the disk surface, and the bending directions at the first and second bending lines are same as the bending directions as the paired flange portions, that is, the bending directions at the first and second bending lines are such a direction as to form a convex shape protruding toward the disk surface. Therefore, it is prevented or reduced that the paired flange portions are deformed due to the bending at the first and second bending lines.

Accordingly, it is possible to readily manufacture the magnetic head suspension capable of preventing the displacement of the magnetic head slider due to the vibrations of the first bending mode and the first torsion mode.

In a preferable configuration, the bending angles at the first and second bending lines are less than or equal to 3°.

In a preferable configuration, the paired flange portions are inclined so as to come closer to a suspension longitudinal center line as they go from the proximal side to the distal side.

In a more preferable configuration, each of the paired flange portions may include a proximal end region and a distal end region. The proximal end region comes closer to the center line at a first inclination angle as it goes from the proximal side to the distal side. The distal end region extends toward the distal side from the proximal end region with an inflection point being sandwiched between them and comes closer to the center line at a second inclination angle, which is smaller than the first inclination angle, as it goes from the proximal side to the distal side.

The configuration makes it possible to effectively reduce moment of inertia of the distal side of the load beam part around the suspension longitudinal center line, thereby realizing minimization of the displacement of the magnetic head slider due to the vibration of the first torsion mode as well as the displacement of the magnetic head slider due to the vibration of the first bending mode while reducing the bending angle at the first bending line.

The inflection point is preferably arranged at the same position as the first bending line or on the proximal side of the first bending line with respect to the suspension longitudinal direction.

The configuration makes it possible to realize minimization of the displacement of the magnetic head slider due to the vibration of the first torsion mode as well as the displacement of the magnetic head slider due to the vibration of the first bending mode while reducing the bending angle at the first bending line.

In any one of the above various configurations, in a case where a length between the distal edge of the supporting part and the dimple in the suspension longitudinal direction is represented by L1, the position of the first bending line with respect to the suspension longitudinal direction may be set in such a manner as that L3, which is a length between the distal edge of the supporting part and the first bending line in the suspension longitudinal direction, satisfies a condition of $0.53*L1 \leq L3 \leq 0.67*L1$.

The configuration makes it also possible to realize minimization of the displacement of the magnetic head slider due to the vibration of the first torsion mode as well as the displacement of the magnetic head slider due to the vibration of the first bending mode while reducing the bending angle at the first bending line.

In any one of the above various configurations, in a case where a length between the distal edge of the supporting part and the dimple in the suspension longitudinal direction is represented by L1, the position of the second bending line relative to the first bending line with respect to the suspension longitudinal direction may be set in such a manner as that L4, which is a length between the first bending line and the second bending line in the suspension longitudinal direction, satisfies a condition of $L4 \leq 0.15*L1$.

The configuration makes it also possible to realize minimization of the displacement of the magnetic head slider due to the vibration of the first torsion mode as well as the displacement of the magnetic head slider due to the vibration of the first bending mode while reducing the bending angle at the first bending line.

In any one of the above various configurations, the magnetic head suspension may preferably further include a damper fixed on a surface of the main body portion that is opposite from the disk surface so as to be positioned on the proximal side of the first bending line.

BRIEF DESCRIPTION OF THE DRAWINGS

FIG. 9C is a top view of an example 3-2 regarding the first and second modified examples.

DETAILED DESCRIPTION OF THE PREFERRED EMBODIMENTS

Hereinafter, a preferred embodiment of a magnetic head suspension according to the present invention will be described, with reference to the attached drawings.

Figure 1:
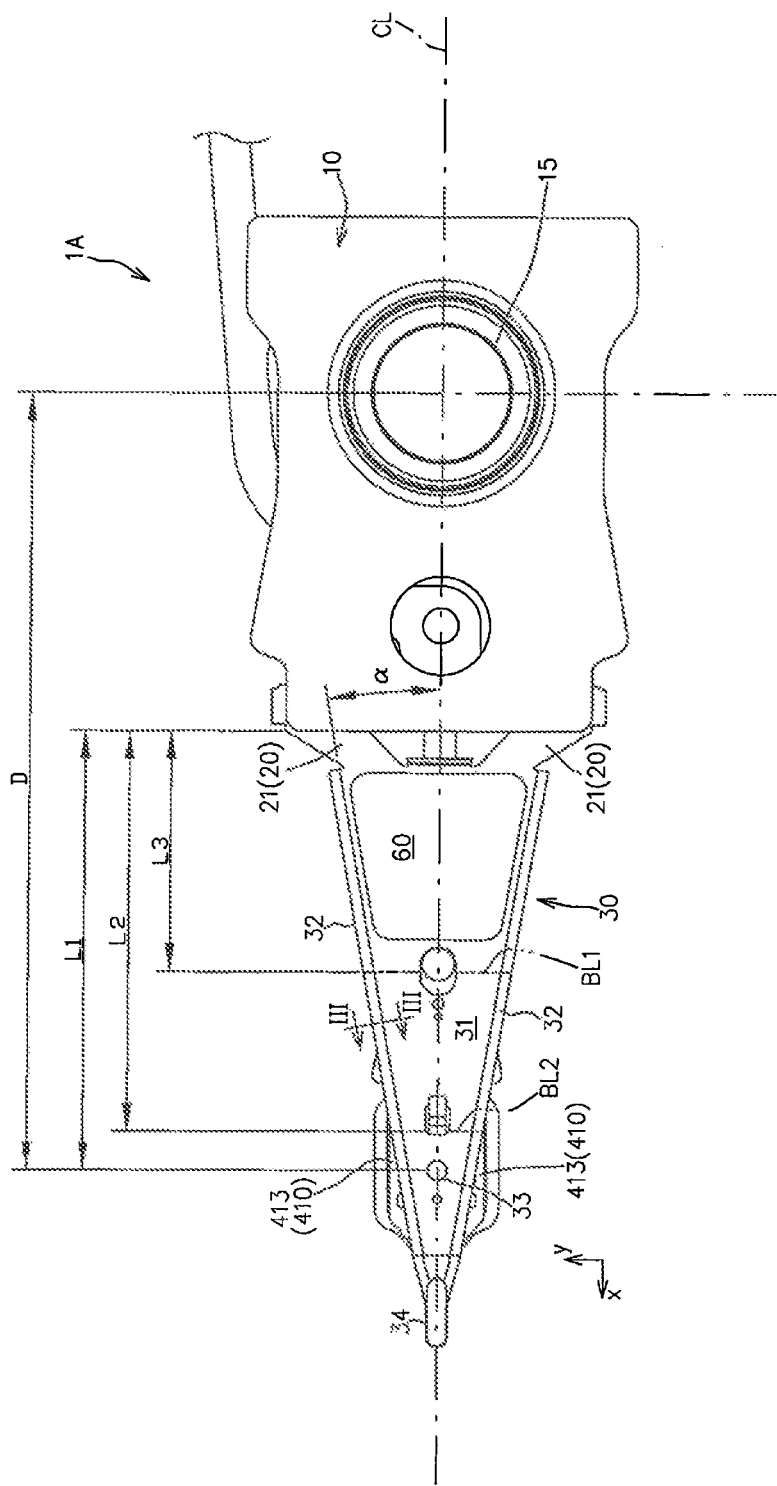
FIG. 1 is a top view of a magnetic head suspension according to one embodiment of the present invention.
Figure 2:
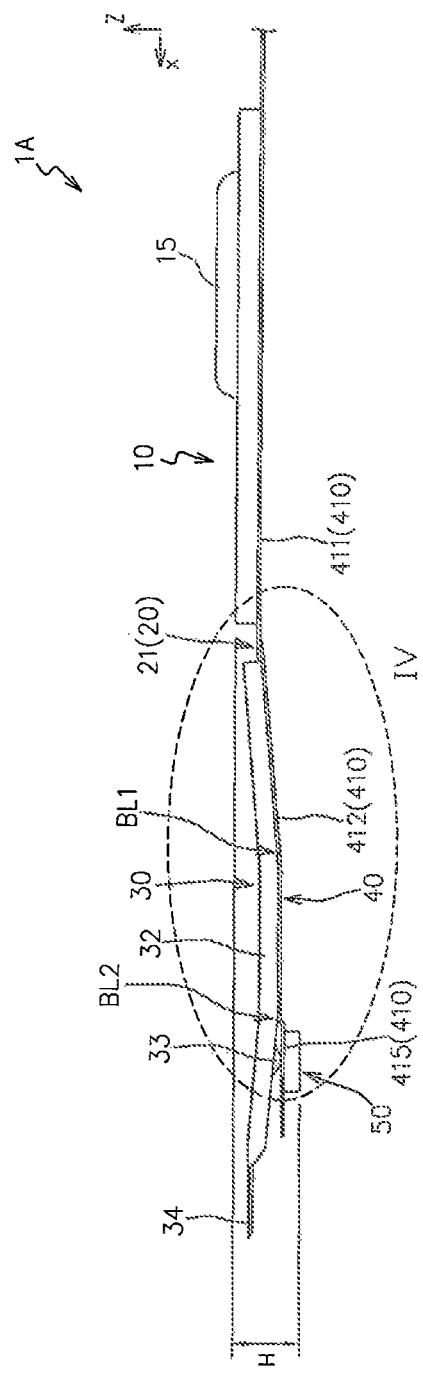
FIG. 2 is a side view of the magnetic head suspension according to the embodiment.

FIGS. 1 and 2 are a top view (a plan view as viewed from a side opposite from a disk surface) and a side view of a magnetic head suspension 1A according to the present embodiment, respectively.

As shown in FIGS. 1 and 2, the magnetic head suspension 1A includes a supporting part 10 that is swung in a seek direction parallel to the disk surface directly or indirectly by an actuator (no shown) such as a voice coil motor, a load bending part 20 that is connected to the supporting part 10 so as to generate a load for pressing a magnetic head slider 50 toward the disk surface, a load beam part 30 that is supported through the load bending part 20 by the supporting part 10 and transmits the load to the magnetic head slider 50, and a flexure part 40 that is supported by the load beam part 30 and the supporting part 10 while supporting the magnetic head slider 50.

The supporting part 10 is a member for supporting the load beam part 30 through the load bending part 20 while being directly or indirectly connected to the actuator, and is therefore made to have relatively high rigidity.

In the present embodiment, the supporting part 10 is formed as a base plate including a boss portion 15 to which a distal end of a carriage arm (not shown) is joined by swage processing, the carriage arm being connected to the main actuator.

The supporting part 10 may be preferably made from, for example, a stainless steel plate having a thickness of 0.1 mm to 0.8 mm.

It is of course possible to adopt as the supporting part 10 an arm having a proximal end that is connected to the swing center of the main actuator.

As described above, the load beam part 30 is a member for transmitting the load generated by the load bending part 20 to the magnetic head slider 50, and therefore is required to have a predetermined rigidity.

Figure 3:
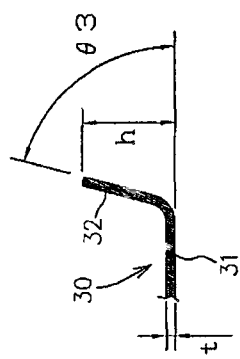
FIG. 3 is a cross sectional view taken along line in FIG. 1.

FIG. 3 is a cross sectional view taken along line in FIG. 1.

As shown in FIGS. 1 and 3, in the present embodiment, the load beam part 30 has a plate-like main body portion 31 that faces the disk surface and paired right and left flange portions 32 that extend from both side edges of the main body portion 31 in a suspension width direction toward a direction opposite from the disk surface, and secures the rigidity by the flange portions 32.

The load beam part 30 may be preferably made from, for example, a stainless steel plate having a thickness of 0.02 mm to 0.1 mm.

The main body portion 31 is formed, at its distal end section, with a protrusion 33 that is so-called dimple.

The protrusion 33 is protruded by, for example, about 0.05 mm to 0.1 mm, in a direction toward the disk surface. The protrusion 33 is brought into contact with an upper surface (a reverse surface opposite from a supporting surface that supports the magnetic head slider) of a head-mounting region 415 of the flexure part 40, which is mentioned below.

The load is transmitted to the head-mounting region 415 of the flexure part 40 through the protrusion 33.

In the present embodiment, as shown in FIGS. 1 and 2, the load beam part 30 further integrally includes a lift tab 34 that extends from a distal end of the main body portion 31 toward the distal side in the suspension longitudinal direction. The lift tab 34 is a member that engages with a lamp provided in a magnetic disk device so as to cause the magnetic head slider 50 to be away from the disk surface in the z direction (a direction perpendicular to the disk surface; see FIG. 2) at the time when the magnetic head suspension 1A is swung by the main actuator so that the magnetic head slider 50 is positioned outward from the disk surface in a radial direction.

Furthermore, in the present embodiment, as shown in FIG. 1, each of the paired flange portions 32 of the load beam part 30 is inclined so as to come closer to a suspension longitudinal center line CL as it goes from the proximal side to the distal side.

The configuration makes it possible to reduce moment of inertia of distal side of the load beam part 30 around the center line CL, thereby increasing resonant frequencies of the first torsion mode and the first bending mode as well as preventing a displacement of the magnetic head slider 50 at the time when the magnetic head suspension 1A is vibrated.

Furthermore, as shown in FIGS. 1 and 2, the load beam part 30 is bent at first and second bending lines BL 1 and BL2.

The detailed description of bending structures at the first and second bending lines BL1, BL2 will be made later.

The load bending part 20 generates the pressing load for pressing the magnetic head slider 50 toward the disk surface in accordance with its elastic deformation.

As shown in FIG. 1, in the present embodiment, the load bending part 20 includes paired right and left leaf springs 21 that have plate surfaces facing the disk surface and are disposed away from each other with the center line CL being sandwiched between them.

Preferably, the paired leaf springs 21 are elastically bent at a predetermined bent position in such a direction as to cause the magnetic head suspension 50 to be come close to the disk surface before the magnetic head suspension 1 is mounted to the magnetic disk device, and is mounted to the magnetic disk device in a state where the paired leaf springs are elastically bent back so as to generate the pressing load.

The load bending part 20 is made from a stainless steel plate of 0.02 mm to 0.1 mm thick, for example.

In the present embodiment, as shown in FIG. 1, the load bending part 20 is integrally formed with the main body portion 31 and the flange portions 32 of the load beam part 30.

More specifically, the magnetic head suspension 1 according to the present embodiment includes a load beam part/load bending part component that integrally forms the main body portion 31 and the flange portions 32 of the load beam part 30 as well as the load bending part 20. The load beam part/load bending part component is connected by welding to the supporting part 10 in a state where an upper surface, which is opposite from the disk surface, of the proximal side of the load beam part/load bending part component is brought into contact with a lower surface of the supporting part 10 that faces the disk surface.

Of course, it is possible that the load beam part 30 is made separately from the main body portion 31 and the flange portions 32, and is then connected to the main body portion 31 by welding or the like.

The flexure part 40 is fixed by welding or the like to the load beam part 30 and the supporting part 10 while supporting the magnetic head slider 50.

More specifically, the flexure part 40 includes a flexure metal plate 410.

As shown in FIG. 2, the flexure metal plate 410 includes a supporting part fixed region 411 fixed by welding or the like to the supporting part 10, a load beam part fixed region 412 fixed by welding or the like to the load beam part 30, paired supporting pieces 413 extending toward the distal side in the suspension longitudinal direction from both sides, in the suspension width direction, of the distal portion of the load beam part fixed region 412, and the head-mounting region 415 supported by the supporting pieces 413.

The head-mounting region 415 supports the magnetic head slider 50 at its lower surface that faces the disk surface, as shown in FIG. 2.

As explained earlier, the protrusion 33 is brought into contact with the upper surface of the head-mounting region 415, so that the head-mounting region 415 could sway flexibly in a roll direction and in a pitch direction, with the protrusion 33 functioning as a fulcrum.

The flexure metal plate 410 has rigidity lower than that of the load beam part 30, so that the head-mounting region 415 could sway in the roll direction and in the pitch direction.

The flexure metal plate 410 may be made from, for example, a stainless steel plate having a thickness of 0.01 mm to 0.025 mm.

Preferably, the flexure part 40 may be integrally provided with a wiring structure (not shown) for electrically connecting the magnetic head slider 50 to an outside member.

More specifically, the wiring structure may include an insulating layer laminated on the lower surface of the flexure metal plate 410 that faces the disk surface, and a signal wiring laminated on a surface of the insulating layer that faces the disk surface.

Preferably, the signal wiring may include an insulative cover layer enclosing the signal wiring.

The bending structures of the load beam part 30 at the first and second bending lines BL1, BL2 will be now explained.

Figure 4:
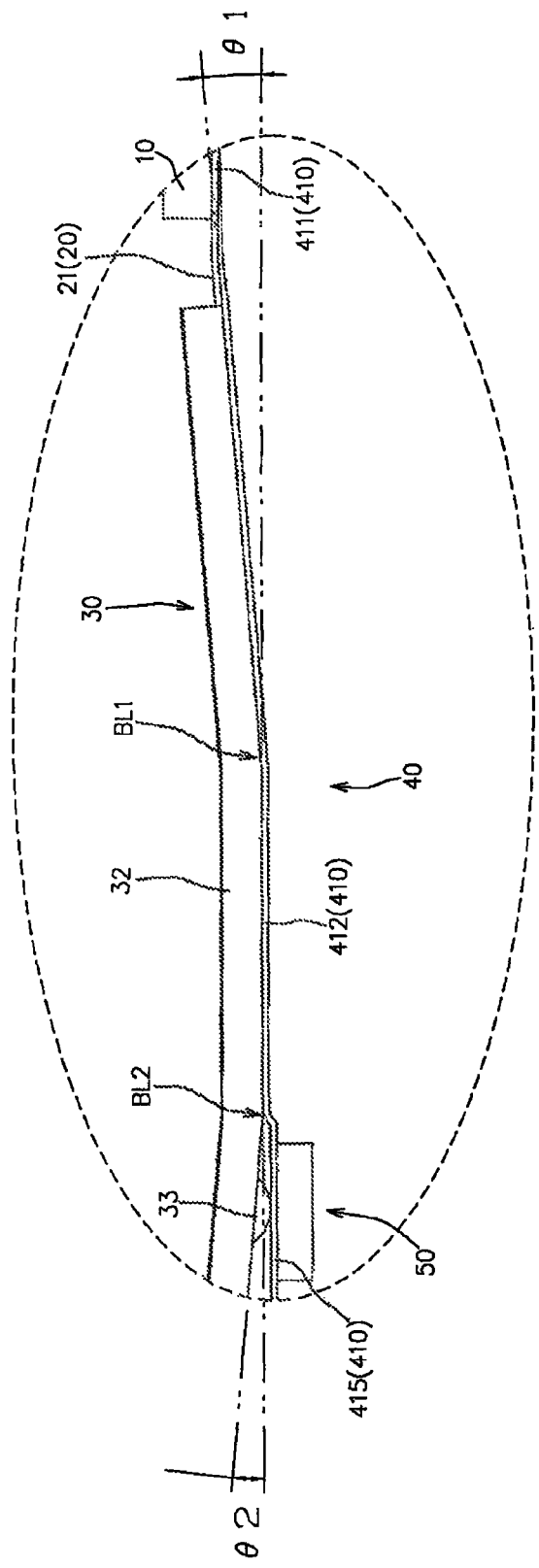
FIG. 4 is an enlarged view of a portion IV in FIG. 2.

FIG. 4 is an enlarged view of IV portion in FIG. 2.

As shown in FIGS. 1, 2 and 4, the load beam part 30 is bent at the first bending line BL1 in such a convex manner as to project in the direction toward the disk surface, the first bending line being positioned between the proximal end portion of the load beam part 30 and the dimple 33 with respect to the suspension longitudinal direction and being along the suspension width direction. The load beam part 30 is also bent at the second bending line BL2 in such a manner as to project in the direction toward the disk surface, the second bending line BL2 being positioned between the first bending line BL1 and the dimple 33 with respect to the suspension longitudinal direction and being along the suspension width direction.

More specifically, in the present embodiment, the load beam part 30 is amended at two positions of the first and second bending lines BL1, BL2 in such a manner as to project to the same direction (the direction toward the disk surface).

Please note that FIG. 1 shows the state prior to bending at the first and second bending lines BL1, BL2.

As explained earlier, in the present embodiment, both of the bending directions at the first and second bending lines BL1, BL2 are such a direction as to make the convex shape projecting in the direction toward the disk surface. The configuration allows the load beam part 30 to be bent at the first and second bending lines BL1, BL2 along the suspension width direction while preventing or reducing the deformation of the paired flange portions 32 as much as possible.

More specifically, the load beam part 30 with the paired flange portions 32 is formed by a process of bending a plate-like substrate having a main body portion forming area that forms the main body portion 31 and flange portion forming areas that forms the paired flange portions 32 in such a manner as that each of boundary lines between the main body portion forming area and the flange portion forming areas is made a convex shape projecting to a direction facing the disk surface.

If a bending process is made on the load beam part 30 with the paired flange portions 32 in such a manner as that a bending line along the suspension width direction is formed into a convex shape projecting to a direction away from the disk surface, the paired flange portions 32 are likely to be deformed.

On the other hand, in the present embodiment, the bending process at the boundary lines between the main body portion forming area and the flange portion forming areas as well as the bending process at the first and second bending lines BL1, BL2 are performed in such a manner as to form the convex shape projecting to the direction toward the disk surface.

More specifically, the paired flange portions 32 are formed by bending the flange portion forming areas with respect to the main body portion forming area so that the boundary lines between the main body portion forming area and the flange portion forming areas are made the convex portions projecting to the direction facing the disk surface. The load beam part 30 is also bent at the first and second bending lines BL1, BL2 so that the lines are made the convex portions projecting to the direction facing the disk surface.

As explained above, the bending direction at the first and second bending lines BL1, BL1 is conformed to the bending direction at the paired flange portions. The configuration makes it possible to realize the bending structure at the first and second bending lines BL1, BL2 along the suspension width direction while preventing or reducing deformation of the paired flange portions 32 as much as possible.

Described below is an analysis performed on an example 1 of the magnetic head suspension 1A bent at the first and second bending lines BL1, BL2 in such a convex manner as to project to the direction toward the disk surface.

The example 1 has the following dimensions.

Thickness of the load beam part 30: t (see FIG. 3)=0.025 mm

Height of the paired flange portions 32: h (see FIG. 3)=0.26 mm

Bending angle of each of the paired flange portions 32 with respect to the main body portion 31: $\theta 3$ (see FIG. 3)=70°

Inclination angle of each of the paired flange portions 32 with respect to the suspension longitudinal center line CL: a (see FIG. 1)=10°

Bending angle at the second bending line BL2: $\theta 2$ (see FIG. 4)=3°

Further, the example 1 has the following dimensions with using, as a reference, a condition that is before the load beam part 30 is bent at the first and second bending lines BL1, BL2 and is shown in FIG. 1.

Length between a center of the boss portion 15 and the dimple 33 in the suspension longitudinal direction: D=11 mm Length between a distal edge of the supporting part 10 and the dimple 33 in the suspension longitudinal direction: L1=6.2 mm Length between the distal edge of the supporting part 10 and the second bending line BL2 in the suspension longitudinal direction: L2=0.91*L1 (=5.64 mm)

Length between the distal edge of the supporting part 10 and the first bending line BL1 in the suspension longitudinal direction: L3=0.55*L1 (=3.41 mm)

An analysis (hereinafter referred to as first torsion mode analysis) regarding displacement amount of the magnetic head slider 50 in the suspension width direction due to the vibration of first torsion mode and an analysis (hereinafter referred to as first bending mode analysis) regarding displacement amount of the magnetic head slider 50 in the suspension longitudinal direction due to the vibration of first bending mode are made on the thus configured example 1 on the basis of the finite element method.

First, an analysis condition of the first torsion mode analysis is explained.

In this analysis, with respect to the example 1 (hereinafter referred to as example 1-1) with the bending angle θ1 (see FIG. 4) at the first bending line BL 1 being set to 3°, in a state where a reference portion (the boss portion 15) of the supporting part 10 is restrained so as not to be displaced in the z direction (see FIG. 2) perpendicular to the disk surface and also in x direction (see FIGS. 2 and 4) along the suspension longitudinal direction as well as the disk-facing surface of the magnetic head slider 50 that faces the disk surface is restrained so as not to be displaced in the z direction, applied to the reference portion was a forced oscillation (steady-state vibration by periodic external force) in y direction along the suspension width direction so that the load beam part 30 was vibrated in the first torsion mode, and obtained was the displacement amount of the magnetic head slider 50 in the suspension width direction at the time.

More specifically, prepared were a plurality of examples 1-1 having different setting heights H from one another. On each of the plurality of examples 1-1, was applied to the reference portion the forced oscillation while changing its frequency for every predetermined pitch within a predetermined frequency range (for example, a frequency range between 100 Hz-40000 Hz) so that the vibration in the first torsion mode was made, and then obtained was the displacement amount of the magnetic head slider 50 in the suspension width direction at the time when the vibration in the first torsion mode was made for each of the plurality of examples 1-1.

It is determined which one example out of the plurality of examples 1-1 has a minimum displacement amount of the magnetic head slider 50 in the suspension width direction at the time of the vibration in the first torsion mode, and the setting height H of the one example was recognized as a setting height that causes the displacement amount of the magnetic head slider 50 to be minimum.

Figure 5:
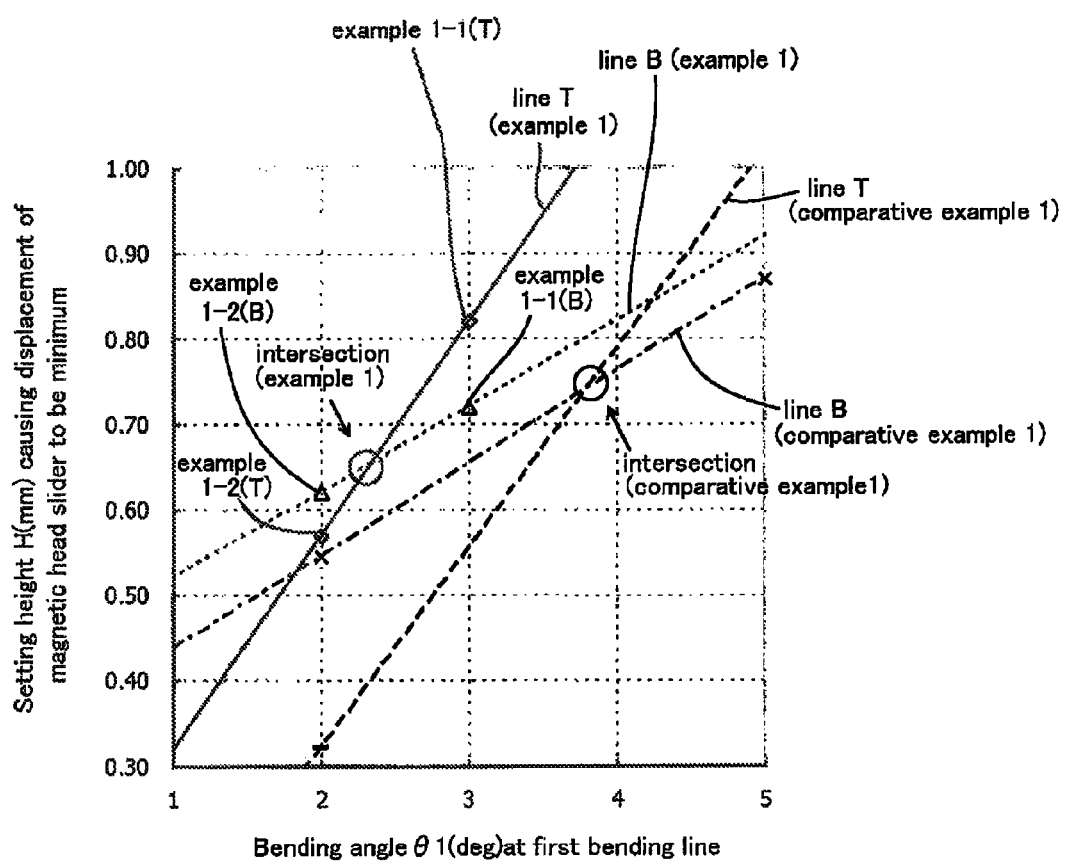
FIG. 5 is a graph of a result of an analysis made on an example 1 of the embodiment and a comparative example 1, and shows a relationship between a bending angle of a load beam part at a first bending line and a setting height for minimizing a displacement of the magnetic head slider at the time when the suspension is vibrated in a first bending mode as well as a displacement of the magnetic head slider at the time when the suspension is vibrated in a first torsion mode.

FIG. 5 shows a result of this analysis with using a reference mark "example 1-1(T)".

The same analysis was performed on the example 1 (hereinafter referred to as example 1-2) with the bending angle θ1 (see FIG. 4) at the first bending line BL 1 being set to 2°.

More specifically, to each of a plurality of examples 1-2 having different setting heights H from one another, applied was the forced oscillation while changing its frequency for every predetermined pitch within the predetermined frequency range so that the vibration in the first torsion mode was made, and then obtained was the displacement amount of the magnetic head slider 50 in the suspension width direction at the time when the vibration in the first torsion mode was made.

It is determined which one example out of the plurality of examples 1-2 has a minimum displacement amount, and the setting height H of the one example was recognized as a setting height that causes the displacement amount of the magnetic head slider 50 to be minimum.

FIG. 5 also shows a result of this analysis with using a reference mark "example 1-2(T)".

A line T (example 1) was obtained by connecting the example 1-1(T) and the example 1-2(T), the line showing a relationship between the bending angle θ1 at the first bending line BL1 and the setting height H that causes the displacement amount of the magnetic head slider 50 to be minimum at the time when applying the forced oscillation with the frequency that generates the vibration of the first torsion mode.

The line T (example 1) will be explained in detail.

In accordance with the bending angle θ1 at the first bending line BL1, the optimum setting height H can be set so that the displacement of the magnetic head slider 50 due to the vibration of the first torsion mode of the magnetic head suspension 1A is minimized.

The line T (example 1) shows the relationship between the bending angle θ1 at the first bending line BL1 and the optimum setting height H. Setting the bending angle θ1 and the setting height H in such a manner as to satisfy the relationship defined by the line makes it possible to reduce the displacement of the magnetic head slider 50 as much as possible even if the magnetic head suspension 1A is vibrated in the first torsion mode.

The first bending mode analysis was performed in accordance with the following condition.

With respect to the example 1-1, in a state where the reference portion of the supporting part 10 is restrained in a complete manner (so as not to be displaced in x, y and z directions) as well as the disk-facing surface of the magnetic head slider 50 is restrained so as not to be displaced in the z direction, applied to only one side in the suspension width direction of the longitudinal center line CL at a predetermined position that is substantially center of the load beam part 30 in the suspension longitudinal direction was the forced oscillation in the z direction so that the load beam part 30 was vibrated in the first bending mode, and obtained was the displacement amount of the magnetic head slider 50 in the suspension longitudinal direction at the time.

More specifically, on each of a plurality of examples 1-1 and a plurality of examples 1-2 having different setting heights H from one another, applied to the reference portion was the forced oscillation while changing its frequency for every predetermined pitch within the predetermined frequency range (for example, a frequency range between 100 Hz-40000 Hz) so that the vibration in the first bending mode was made, and then obtained was the displacement amount of the magnetic head slider 50 in the suspension longitudinal direction at the time when the vibration in the first bending mode was made for each of the plurality of examples 1-1 and the plurality of examples 1-2.

It is determined which one example out of the plurality of examples 1-1 has a minimum displacement amount of the magnetic head slider 50 in the suspension longitudinal direction at the time of the vibration in the first bending mode, and the setting height H of the one example was recognized as a setting height that causes the displacement amount of the magnetic head slider 50 to be minimum.

FIG. 5 also shows a result of this analysis with using a reference mark "example 1-1(B)".

In the same manner, it is determined which one example out of the plurality of examples 1-2 has a minimum displacement amount of the magnetic head slider 50 in the suspension longitudinal direction at the time of the vibration in the first bending mode, and the setting height H of the one example was recognized as a setting height that causes the displacement amount of the magnetic head slider 50 to be minimum.

FIG. 5 also shows a result of this analysis with using a reference mark "example 1-2(B)".

A line B (example 2) was obtained by connecting the example 1-1(B) and the example 1-2(B), the line showing a relationship between the bending angle θ1 at the first bending line BL1 and the setting height H that causes the displacement amount of the magnetic head slider 50 to be minimum at the time when applying the forced oscillation with the frequency that generates the vibration of the first bending mode.

The line B (example 1) will be explained in detail.

In accordance with the bending angle θ1 at the first bending line BL1, the optimum setting height H can be set so that the displacement of the magnetic head slider 50 due to the vibration of the first bending mode of the magnetic head suspension 1A is minimized.

The line B (example 1) shows the relationship between the bending angle θ1 at the first bending line BL1 and the optimum setting height H. Setting the bending angle θ1 and the setting height H in such a manner as to satisfy the relationship defined by the line makes it possible to reduce the displacement of the magnetic head slider 50 as much as possible even if the magnetic head suspension 1A is vibrated in the first bending mode.

The line T (example 1) and the line B (example 1) intersect with each other at an intersection point (example 1), which means a combination of the bending angle θ1 and the setting height H that can cause the displacement of the magnetic head slider 50 to be minimum for the vibration of the first torsion mode as well as the vibration of the first bending mode.

That is, in the example 1, setting the bending angle θ1 at the first bending line BL1 to approximate 2.3° (and setting the setting height H to approximate 0.65 mm) makes it possible to minimize the displacement of the magnetic head slider 50 for the vibration of the first torsion mode and the vibration of the first bending mode.

A comparative example 1 that is different from the example 1 only in that the bending at the second bending line BL2 is not made was prepared. On each of one and the other comparative examples 1 (hereinafter referred to as comparative examples 1-1 and 1-2), the same analysis was made.

More specifically, to each of a plurality of comparative examples 1-1 having different setting heights H from one another and a plurality of comparative examples 1-2 having different setting heights H from one another, applied was the forced oscillation so that the vibration in the first torsion mode was made, and then obtained was the displacement amount of the magnetic head slider 50 at the time.

It is determined which one comparative example out of the plurality of comparative examples 1-1 has a minimum displacement amount of the magnetic head slider 50 in a case of applying the forced oscillation that causes the vibration in the first torsion mode, and it is also determined which one comparative example out of the plurality of comparative examples 1-2 has a minimum displacement amount of the magnetic head slider 50 in a case of applying the forced oscillation that causes the vibration in the first torsion mode. A line T (comparative example 1) (see FIG. 5) was then obtained based on the setting height H of the one comparative example out of the comparative examples 1-1 and the setting height H of the one comparative example out of the comparative examples 1-2.

In the same manner, a forced oscillation was applied to each of the plurality of comparative examples 1-1 and the plurality of comparative examples 1-2 so that the vibration in the first bending mode was made, and then obtained was the displacement amount of the magnetic head slider 50 at the time.

It is determined which one comparative example out of the plurality of comparative examples 1-1 has a minimum displacement amount of the magnetic head slider 50 in a case of applying the forced oscillation that causes the vibration in the first bending mode, and it is also determined which one comparative example out of the plurality of comparative examples 1-2 has a minimum displacement amount of the magnetic head slider 50 in a case of applying the forced oscillation that causes the vibration in the first bending mode. A line B (comparative example 1) (see FIG. 5) was then obtained based on the setting height H of the one comparative example out of the comparative examples 1-1 and the setting height H of the one comparative example out of the comparative examples 1-2.

It is understood from FIG. 5 (the intersection point (comparative example)) that the bending angle θ1 at the first bending line BL1 that can cause the displacement of the magnetic head slider 50 to be minimized for both the vibrations of the first torsion mode and the first bending mode is approximate 3.8° (and the setting height H is approximate 0.74 mm).

The bending angle is larger than the bending angle θ1 (=approximate 2.3°) at the first bending line BL1 that can cause the displacement of the magnetic head slider 50 to be minimized for both the vibrations of the first torsion mode and the first bending mode in the example 1.

More specifically, the configuration (the example 1) configured to be bent at the second bending line BL2 can realize the minimization of the displacement of the magnetic head slider 50 for both the vibrations of the first torsion mode and the first bending mode in a state where the bending angle at the first bending line BL1 is smaller in comparison with the configuration (the comparative example 1) configured not to be bent at the second bending line BL2.

The line T (example 1) and the line B (example 1) can be moved in parallel along a vertical axis direction in FIG. 5 by shifting the bending position of the leaf springs 21. More specifically, it is possible to change only the setting height H while keeping the value of the bending angle θ1 at the intersection point (example 1) substantially unchanged by shifting the bending position of the leaf springs 21.

Accordingly, it is possible to set the setting height H (for example, at the intersection point (example 1)), which allows the displacement of the magnetic head slider 50 due to the vibration of the first torsion mode and the displacement of the magnetic head slider 50 due to the vibration of the first bending mode to be simultaneously minimized, to a predetermined value in accordance with specification or request by shifting the bending position of the leaf springs 21.

In the magnetic head suspension with the paired flange portions 32, the smaller the bending angle at the bending line along the suspension width direction is, the more preferable it is. Experience shows that bending with the bending angle more than 3° results in deformation of the paired flange portions 32.

Therefore, the example 1 makes it possible to reduce the displacement amount of the magnetic head slider 50 for the vibration of the first torsion mode as well as the vibration of the first bending mode as much as possible while preventing or reducing as much as possible deformation of the paired flange portions 32.

The same analysis was performed on an example 2 that is different from the example 1 only in that the inclination angle α is changed to 11.7°.

More specifically, obtained were a line T (example 2) showing a relationship between the bending angle θ1 at the first bending line BL1 and the setting height H that causes the displacement amount of the magnetic head slider 50 to be minimum at the time when applying the forced oscillation with the frequency that generates the vibration of the first torsion mode, and a line B (example 2) showing a relationship between the bending angle θ1 at the first bending line BL1 and the setting height H that causes the displacement amount of the magnetic head slider 50 to be minimum at the time when applying the forced oscillation with the frequency that generates the vibration of the first bending mode.

Figure 6:
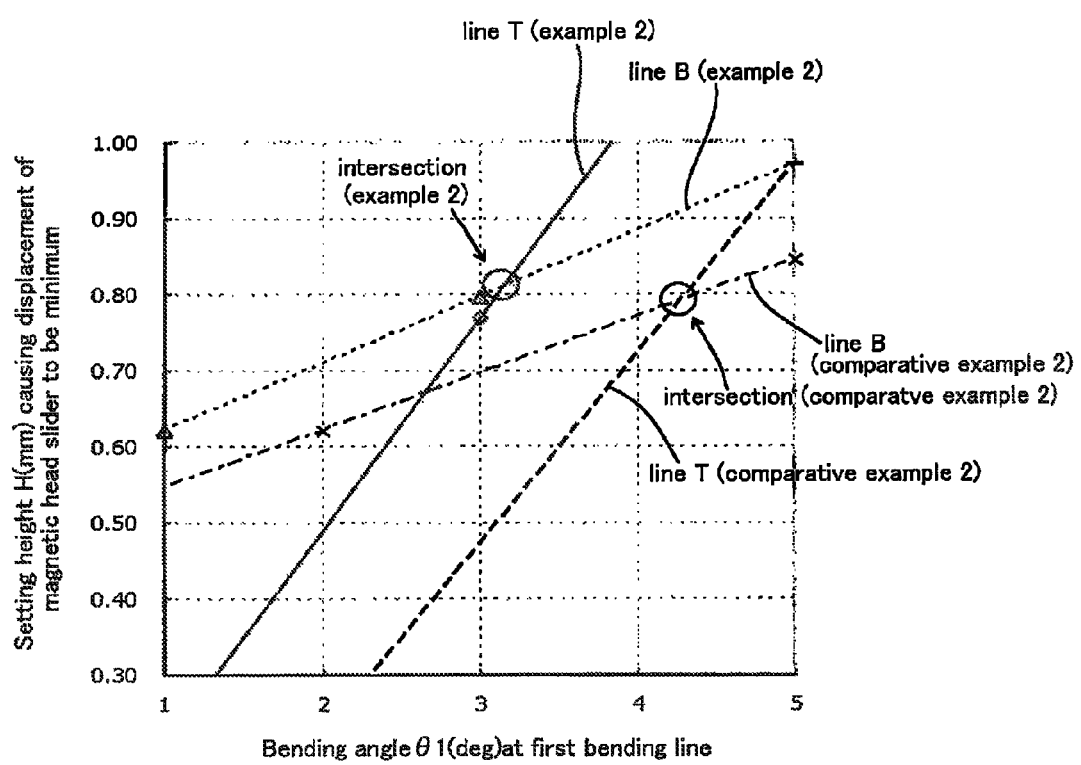
FIG. 6 is a graph of a result of an analysis made on an example 2 of the embodiment and a comparative example 2, and shows a relationship between a bending angle of a load beam part at a first bending line and a setting height for minimizing a displacement of the magnetic head slider at the time when the suspension is vibrated in a first bending mode as well as a displacement of the magnetic head slider at the time when the suspension is vibrated in a first torsion mode.

FIG. 6 shows these lines.

The same analysis was performed on a comparative example 2 that is different from the comparative example 1 only in that the inclination angle α is changed to 11.7°.

More specifically, obtained were a line T (comparative example 2) showing a relationship between the bending angle θ1 at the first bending line BL1 and the setting height H that causes the displacement amount of the magnetic head slider 50 to be minimum at the time when applying the forced oscillation with the frequency that generates the vibration of the first torsion mode, and a line B (comparative example 2) showing a relationship between the bending angle θ1 at the first bending line BL1 and the setting height H that causes the displacement amount of the magnetic head slider 50 to be minimum at the time when applying the forced oscillation with the frequency that generates the vibration of the first bending mode.

FIG. 6 also shows these lines.

It was recognized from FIG. 6 that the bending angle θ1 at the first bending line BL1 that cause the displacement amount of the magnetic head slider 50 to be minimum for both the first torsion mode and the first bending mode was approximate 3.1° (an intersection point (example 2) in the example 2 while the bending angle θ1 was approximate 4.3° (an intersection point (comparative example 2) in the comparative example 2).

It is also understood from the fact that the configuration (the example 2) configured to be bent at the second bending line BL2 can realize the minimization of the displacement of the magnetic head slider 50 for both the vibrations of the first torsion mode and the first bending mode in a state where the bending angle at the first bending line BL1 is smaller in comparison with the configuration (the comparative example 2) configured not to be bent at the second bending line BL2.

As shown in FIG. 1, there is preferably provided a damper 60 fixed to a surface of the main body portion 31 that is opposite from the disk surface so as to be positioned in a region on a proximal side of the first bending line BL1.

The configuration makes it possible to damp the displacement of the magnetic head slider 50 at the time of the vibration of the magnetic head suspension 1A.

Figure 7:
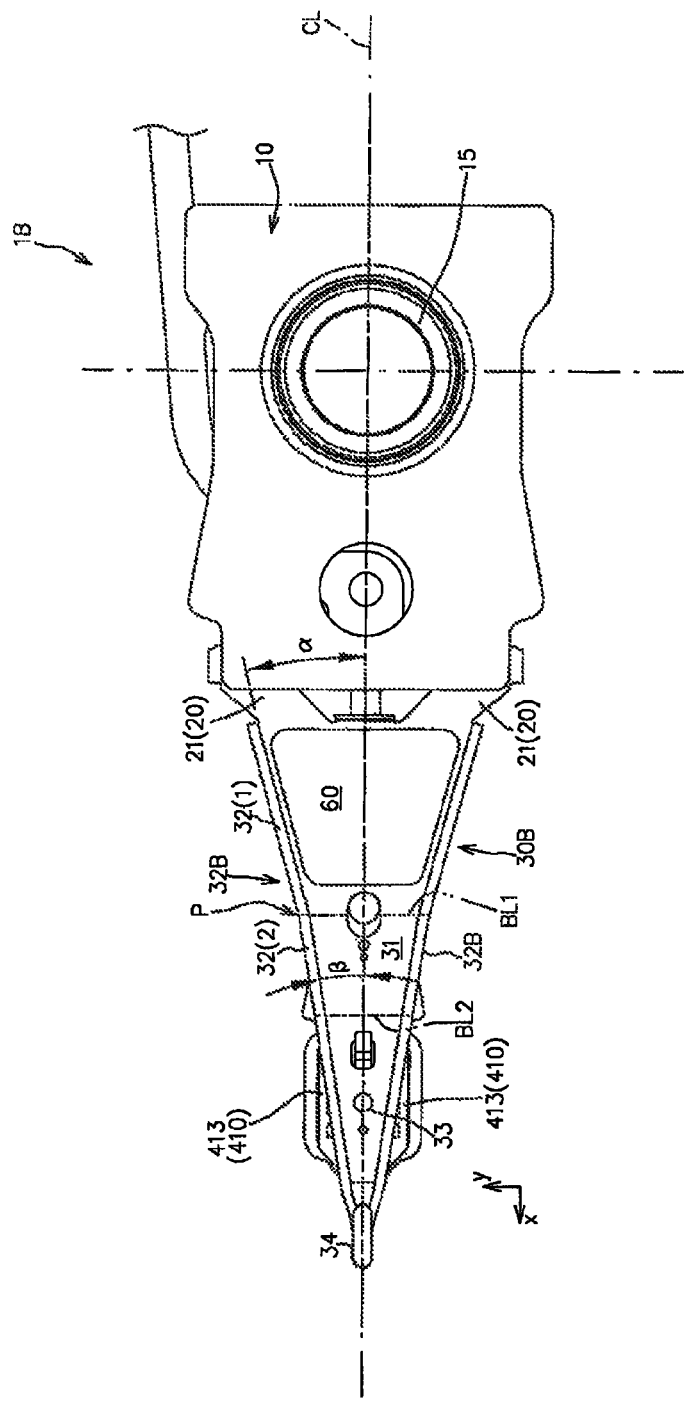
FIG. 7 is a top view of a first modified example of the embodiment.
Figure 8:
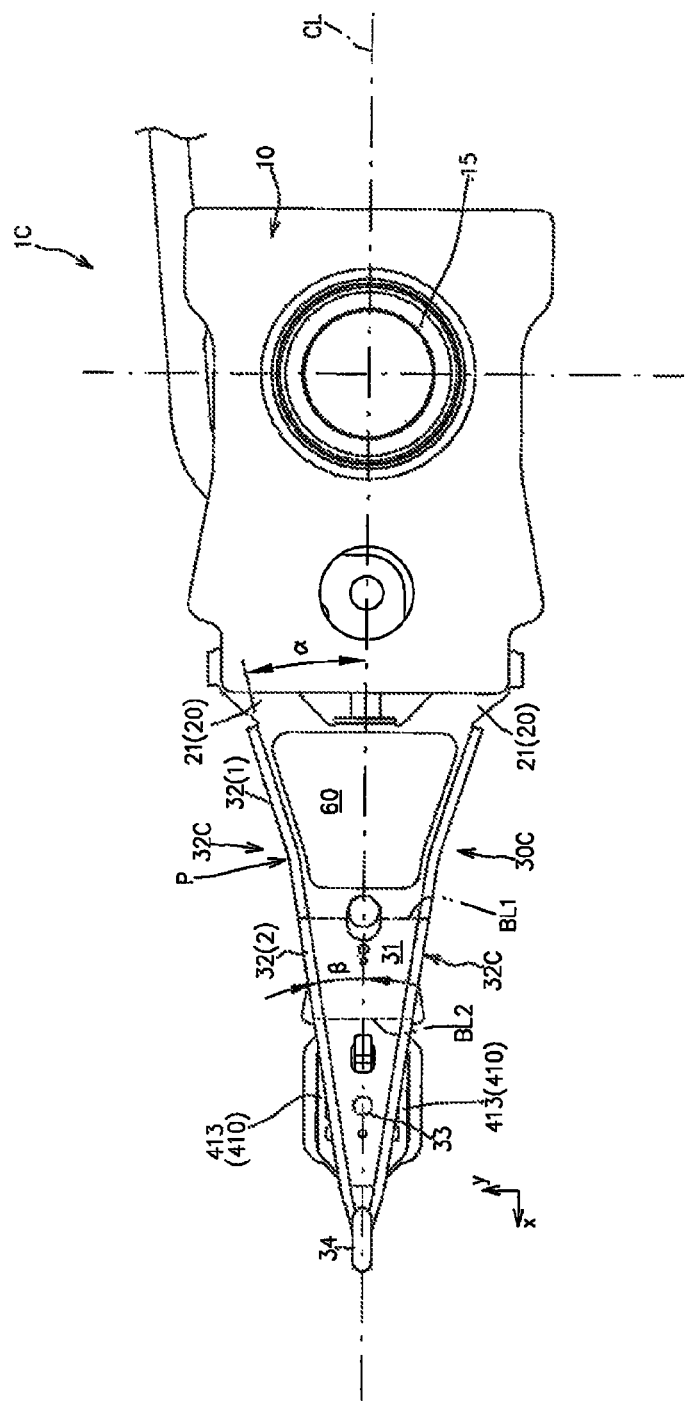
FIG. 8 is a top view of a second modified example of the embodiment.

FIGS. 7 and 8 are top views of first and second modified examples 1B, 1C of the magnetic head suspension 1A according to the present embodiment.

In the figures, the members same as those in the present first embodiment are denoted by the same reference numerals.

The first and second modified examples 1B, 1C include load beam parts 30B, 30C, respectively, in place of the load beam part 30, in comparison with the magnetic head suspension 1A.

Each of the load beam parts 30B, 30C is configured so that corresponding paired flange portions 32B, 32C include proximal end regions 32(1) and distal end regions 32(2), the proximal end region 32(1) coming closer to the center line CL at a first inclination angle α as it goes from the proximal end to the distal end, the distal end region 32(2) extending toward the distal side from the proximal end region 32(1) with an inflection point P being sandwiched between them and coming closer to the center line CL at a second inclination angle β, which is smaller than the first inclination angle α, as it goes from the proximal end to the distal end.

The first and second modified examples 1B, 1C make it possible to more effectively reduce the moment of inertia of the distal side of the load beam parts 30B, 30C, thereby causing both the displacements of the magnetic head slider 50 due to the vibrations of the first torsion mode and the first bending mode to be minimized at the same time with the smaller making the bending angle θ1 at the first bending line BL1.

In the first modified example 1B, as shown in FIG. 7, the inflection point P is arranged at the same position as the first bending line BL1 with respect to the suspension longitudinal direction.

On the other hand, in the second modified example 1C, as shown in FIG. 8, the inflection point P is arranged on the proximal side of the first bending line BL1 with respect to the suspension longitudinal direction.

Described below is a result of an analysis performed on an example 3 and a comparative example 3 regarding the first and second modified examples 1B, 1C having the inflection point P.

Figure 9A:
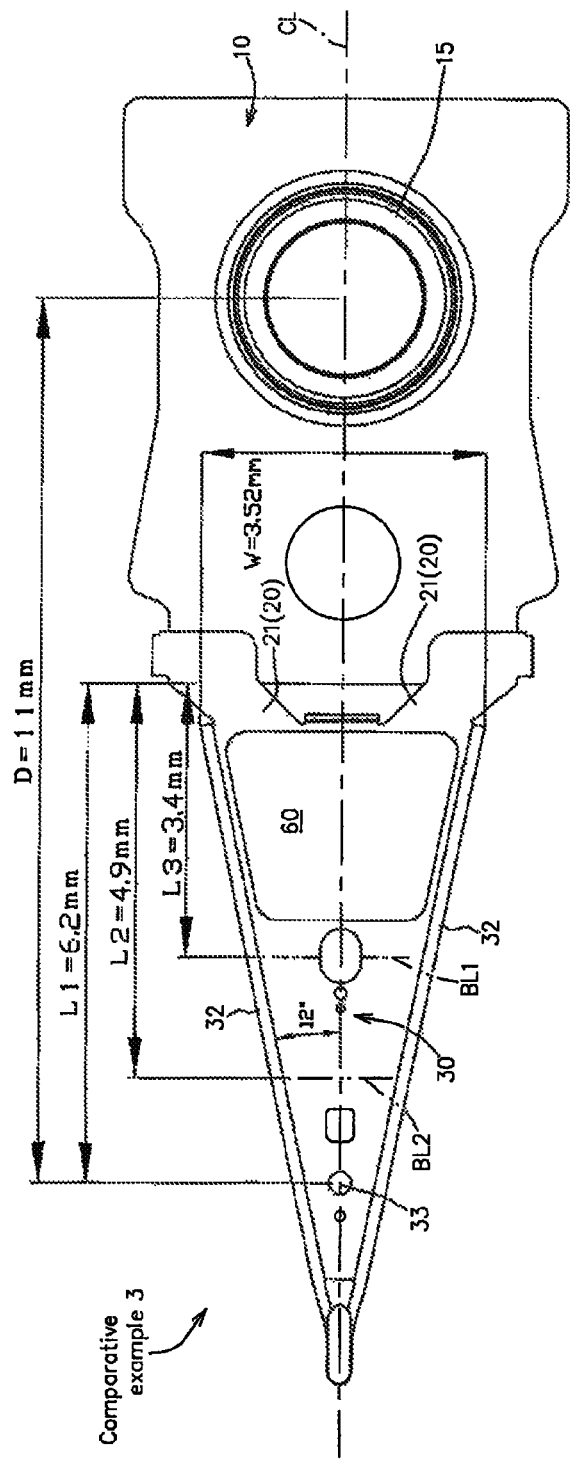
FIG. 9A is a top view of a comparative example 3 regarding the first and second modified examples.
Figure 9B:
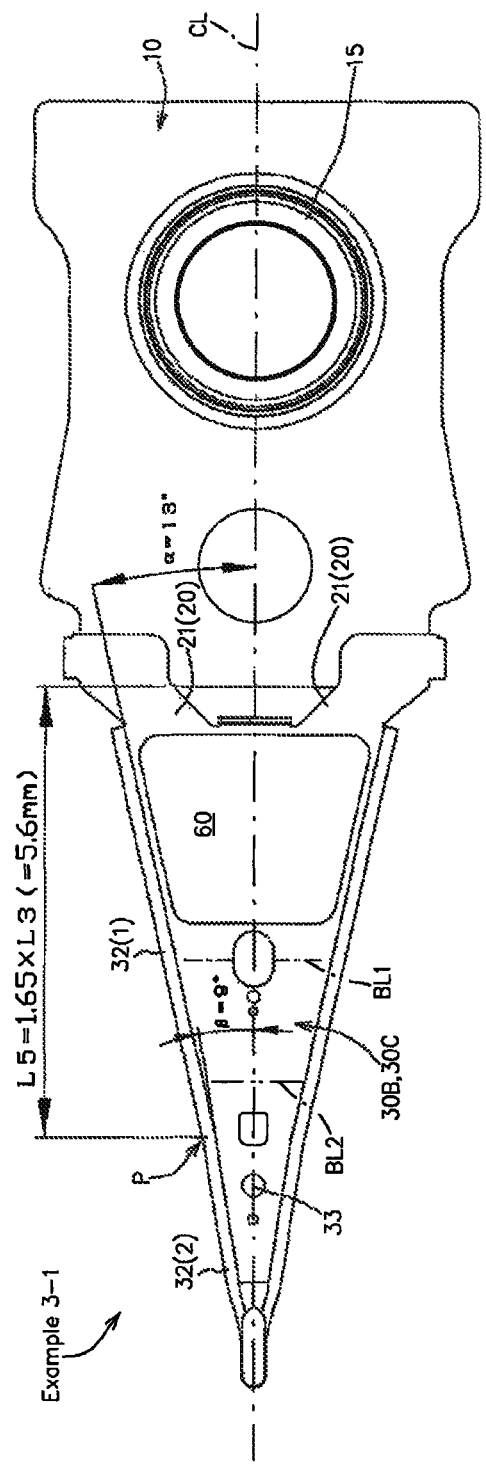
FIG. 9B is a top view of an example 3-1 regarding the first and second modified examples.
Figure 9D:
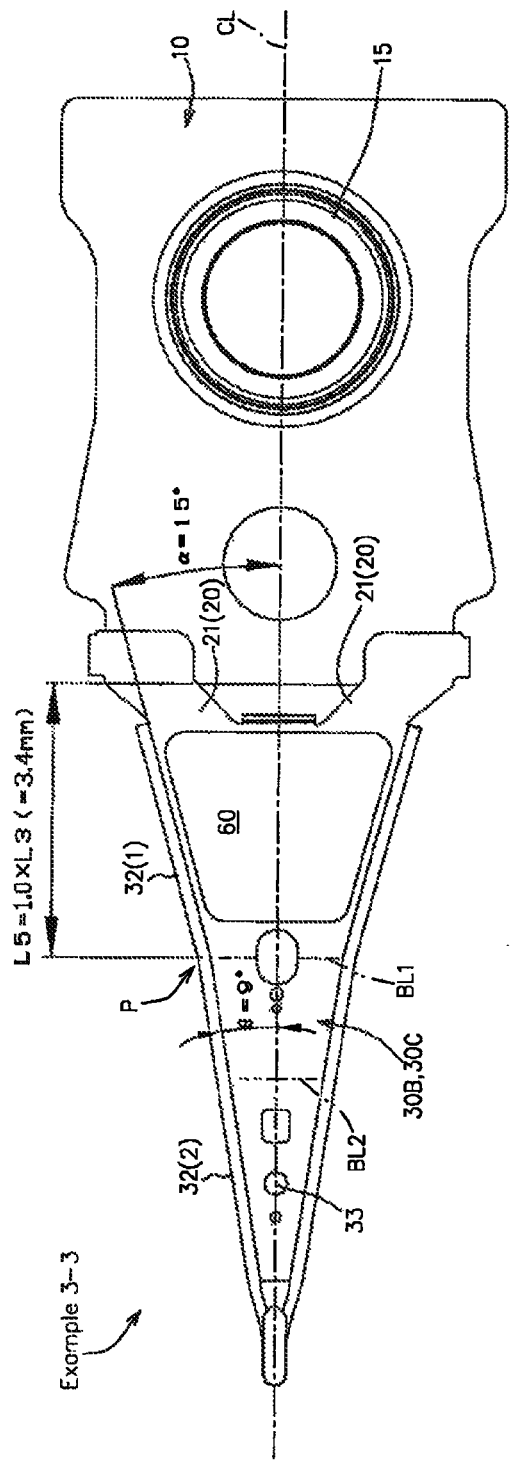
FIG. 9D is a top view of an example 3-3 regarding the first and second modified examples.
Figure 9E:
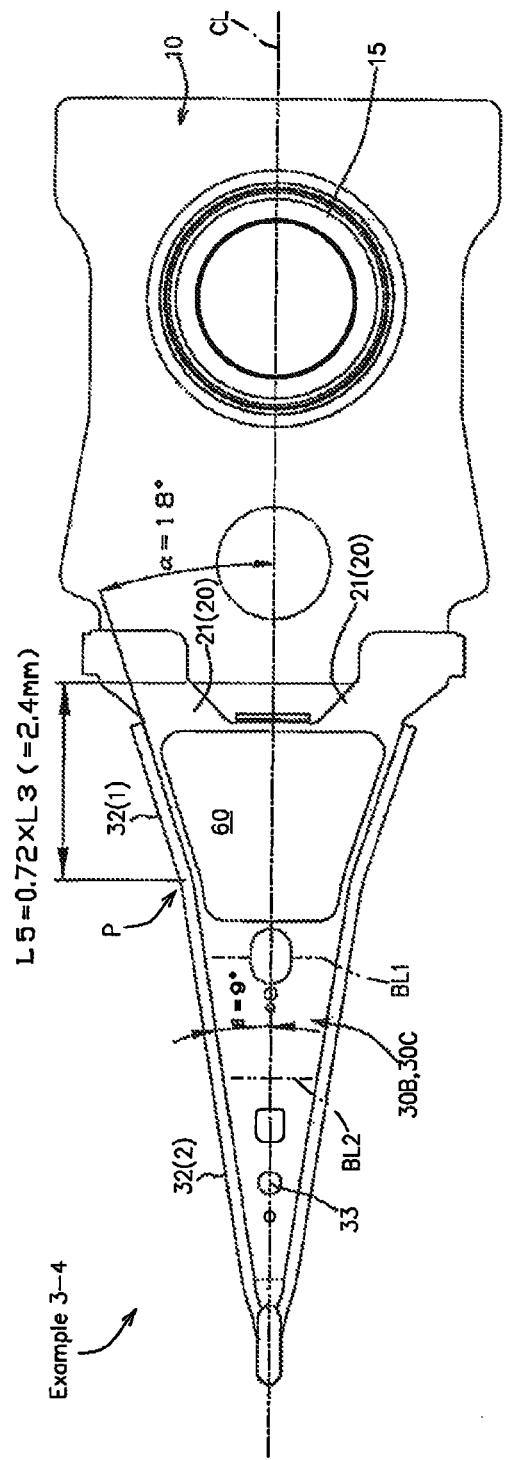
FIG. 9E is a top view of an example 3-4 regarding the first and second modified examples.
Figure 9F:
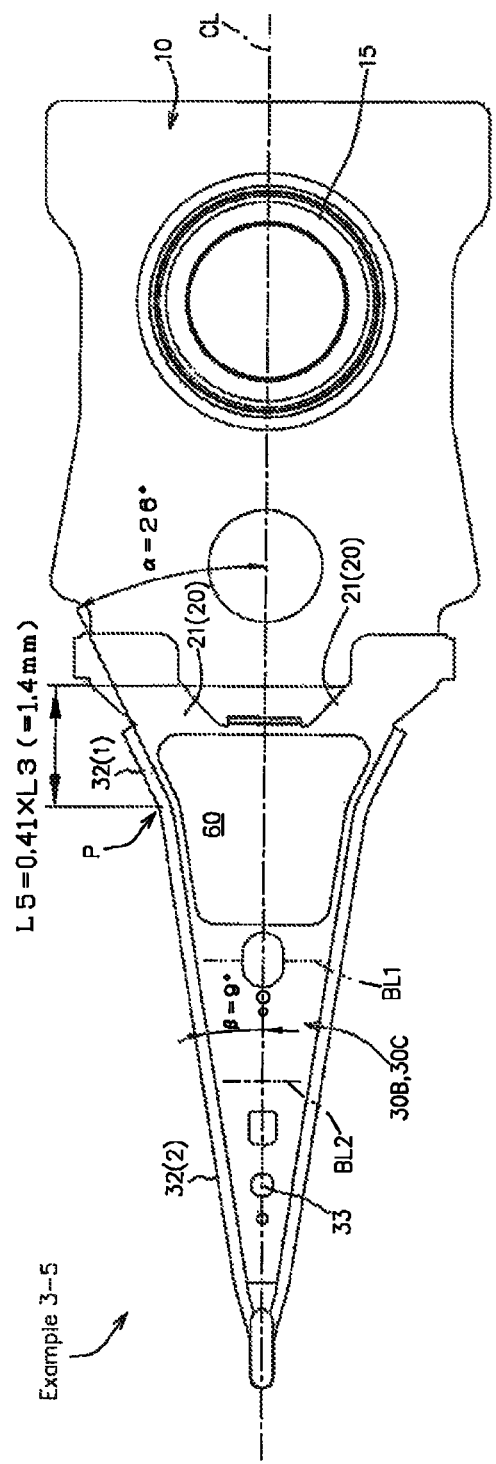
FIG. 9F is a top view of an example 3-5 regarding the first and second modified examples.

FIG. 9A is a plan view of the comparative example 3, and FIGS. 9B-9F are plan views of the examples 3.

The flexure part 40 is not shown in FIGS. 9A-9F.

The example 3 and the comparative example 3 have the following dimensions.

Thicknesses of the load beam parts 30, 30B, 30C: t=0.025 mm

Height of the paired flange portions 32B, 32C: h=0.26 mm

Bending angle of each of the paired flange portions 32B, 32C with respect to the main body portion 31: 70°

Bending angle at the second bending line BL2 (angle corresponding to θ2 in FIG. 4): 3°

Further, the example 3 and the comparative example 3 have the following dimensions with using, as a reference, a condition that is before the load beam part 30 is bent at the first and second bending lines BL1, BL2 (see FIGS. 9A-9F).

Length between the center of the boss portion 15 and the dimple 33 in the suspension longitudinal direction: D=11 mm Length between the distal edge of the supporting part 10 and the dimple 33 in the suspension longitudinal direction: L1=6.2 mm Length between the distal edge of the supporting part 10 and the second bending line BL2 in the suspension longitudinal direction: L2=4.9 mm Length between the distal edge of the supporting part 10 and the first bending line BL1 in the suspension longitudinal direction: L3=3.4 mm Prepared were a plurality of suspensions with the above dimensions including a suspension (see FIG. 9A; the comparative example 3) without the inflection point, a suspension (see FIG. 9B; hereinafter referred to as example 3-1) with the inflection point P in such a position as that a length L5 between the inflection point P and the distal edge of the supporting part 10 in the suspension longitudinal direction was 1.65*L3 (=5.6 mm), a suspension (see FIG. 9C; hereinafter referred to as example 3-2) with the inflection point P in such a position as that the length L5 was 1.29*L3 (=4.4 mm), a suspension (see FIG. 9D; hereinafter referred to as example 3-3) with the inflection point P in such a position as that the length L5 was 1.0*L3 (=3.4 mm), a suspension (see FIG. 9E;

hereinafter referred to as example 3-4) with the inflection point P in such a position as that the length L5 was 0.72*L3 (=2.4 mm), and a suspension (see FIG. 9F; hereinafter referred to as example 3-5) with the inflection point P in such a position as that the length L5 was 0.41*L3 (=1.4 mm).

In the comparative example 3, the proximal width W of the load beam part 30 was set to 3.52 mm, and the flange portion 32 came closer to the suspension longitudinal center line CL at an inclination angle of 12" as it goes from the proximal side to the distal side.

On the other hand, in the examples 3-1 to 3-5, the proximal width W of the load beam part 30B (30C) was same as the proximal width W of the load beam part in the comparative example, and inclination angle α of the distal end region 32(2) of the load beam part 30B (30C) with respect to the suspension longitudinal was fixed to 9°. In the examples 3-1 to 3-5, the positions of the inflection points P were changed as described above so that the inclination angles β of the proximal end regions 32(1) of the load beam parts 36B (30C) with respect to the suspension longitudinal center line CL were 13°, 14°, 15°, 18° and 26°, respectively.

Analyses regarding the first torsion mode and the first bending mode were performed on the comparative example 3 and the examples 3-1 to 3-5 on the basis of the finite element method.

First, the analysis regarding the first torsion mode is explained.

For each of the comparative example 3 and the examples 3-1 to 3-5, were prepared a plurality of suspensions that have different setting heights H from one another (see FIG. 2) in a state where the bending angles θ1 (see FIG. 4) at the first bending line BL 1 were fixed to 3°. On each of the plurality of suspensions, applied to the reference portions was the forced oscillation so that the vibration in the first torsion mode was made, and then obtained was the displacement amount of the magnetic head slider 50 in the suspension width direction at the time when the vibration in the first torsion mode was made. It is determined which one suspension out of the plurality of suspensions has a minimum displacement amount of the magnetic head slider 50 in the suspension width direction, and the setting height H of the one suspension was recognized as a setting height that causes the displacement amount of the magnetic head slider 50 in the suspension width direction to be minimum.

The same analysis was performed on the condition that the bending angle θ1 at the first bending line BL1 was fixed to 2°.

More specifically, for each of the comparative example 3 and the examples 3-1 to 3-5 that have the bending angle θ1 fixed to 2°, were prepared a plurality of suspensions that has different setting heights H from one another, and the same analysis was performed on each of the plurality of suspensions.

For each of the comparative example 3 and the examples 3-1 to 3-5, obtained was a line (hereinafter referred to as first torsion mode line) showing a relationship between the bending angle θ1 at the first bending line BL1 and the setting height H that causes the displacement of the magnetic head slider 50 to be minimum at the time of the vibration of the first torsion mode.

Next, the analysis regarding the first bending mode is explained.

For each of the comparative example 3 and the examples 3-1 to 3-5, were prepared a plurality of suspensions that has different setting heights H from one another (see FIG. 2) in a state where the bending angle θ1 (see FIG. 4) at the first bending line BL 1 was fixed to 3°. On each of the plurality of suspensions, in a state where the reference portion is restrained in a complete manner (so as not to be displaced in x, y and z directions) as well as the disk-facing surface of the magnetic head slider 50 is restrained so as not to be displaced in the z direction, applied to only one side in the suspension width direction of the longitudinal center line CL at a predetermined position that is substantially center of the load beam part 30 in the suspension longitudinal direction was the forced oscillation in the z direction so that the vibration of the first bending mode was made. For each of the plurality of suspensions, obtained was the displacement amount of the magnetic head slider 50 in the suspension longitudinal direction at the time when the first bending mode was made. It is determined which one suspension out of the plurality of suspensions has a minimum displacement amount of the magnetic head slider 50 in the suspension longitudinal direction, and the setting height H of the one suspension was recognized as a setting height that causes the displacement amount of the magnetic head slider 50 in the suspension longitudinal direction to be minimum.

The same analysis was performed on the condition that the bending angle θ1 at the first bending line BL1 was fixed to 2°.

More specifically, for each of the comparative example 3 and the examples 3-1 to 3-5 that have the bending angle θ1 fixed to 2°, were prepared a plurality of suspensions that has different setting heights H from one another, and the same analysis was performed on each of the plurality of suspensions.

For each of the comparative example 3 and the examples 3-1 to 3-5, obtained was a line (hereinafter referred to as first bending mode line) showing a relationship between the bending angle θ1 at the first bending line BL1 and the setting height H that causes the displacement of the magnetic head slider 50 to be minimum at the time of the vibration of the first bending mode.

For each of the comparative example 3 and the examples 3-1 to 3-5, obtained was an intersection point of the first torsion mode line and the first bending mode line, and then obtained was a bending angle θ1(min) at the intersection point.

The bending angle θ1(min) is a bending angle capable of causing the displacement of the magnetic head slider 50 to be minimized for both the vibrations of the first torsion mode and the first bending mode.

More specifically, setting the bending angle θ1 at the first bending line BL1 makes it possible to reduce the displacement of the magnetic head slider 50 as much as possible at the time of the vibration of the first torsion mode as well as the vibration of the first bending mode.

Figure 10:
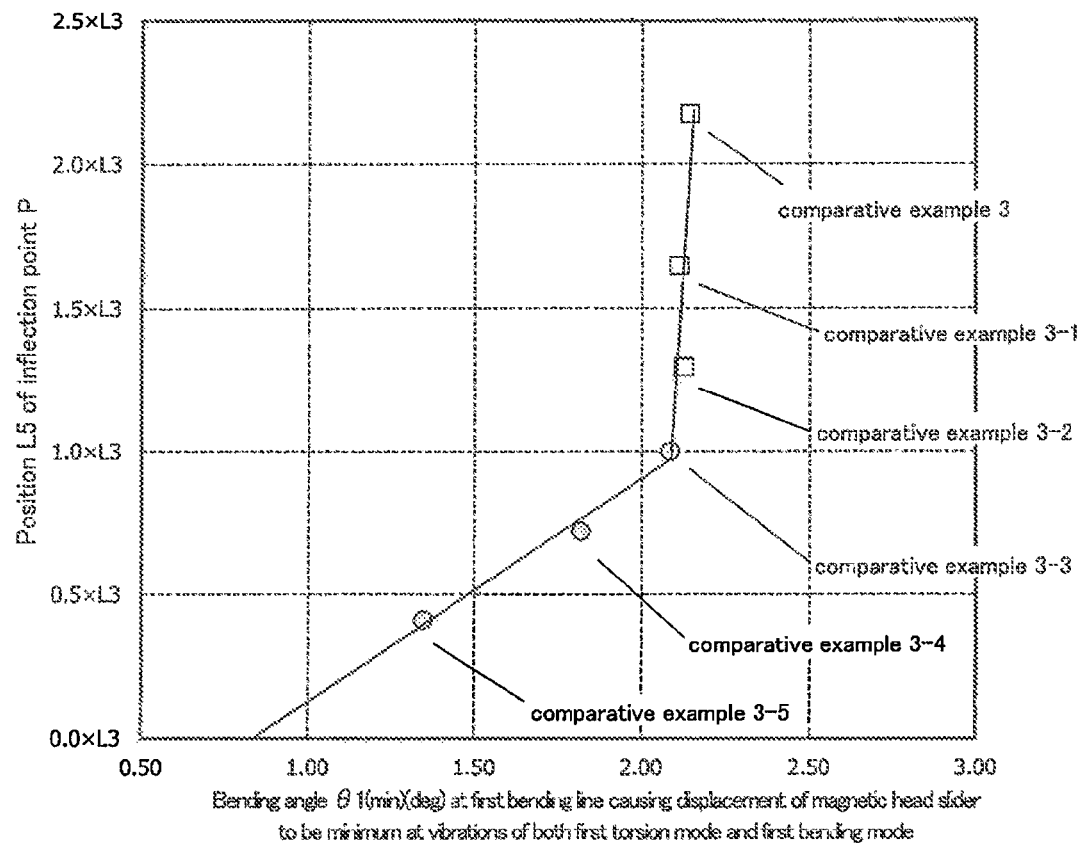
FIG. 10 is a graph of a result of an analysis made on the examples 3-1 to 3-5 and the comparative example 3, and shows a relationship of an inflection point relative to a bending angle at the first bending line for minimizing a displacement of the magnetic head slider at the time when the suspension is vibrated in a first bending mode as well as a displacement of the magnetic head slider at the time when the suspension is vibrated in a first torsion mode.

FIG. 10 is a graph showing a relationship between the bending angle θ1(min) and the inflection point P.

It is understood from FIG. 10 that in a case where the length L5 between the inflection point P and the distal edge of the supporting part 10 in the suspension longitudinal direction is more than 1.0*L3, that is, in a case where the inflection point P is positioned on the distal side of the first bending line BL1 in the suspension longitudinal direction, the bending angle θ1(min) has been kept at a constant value of approximate 2.2° in spite of the position of the inflection point P.

On the other hand, in a case where the length L5 is less than or equal to 1.0*L3, that is, in a case where the inflection point P is positioned on the proximal side of the first bending line BL1 in the suspension longitudinal direction, the bending angle θ1(min) has been reduced from the constant value as the inflection point P is shifted toward the distal side in the suspension longitudinal direction.

From this fact, it is possible to reduce the displacement of the magnetic head slider 50 at the time of the vibration of the first torsion mode as well as at the time of the vibration of the first bending mode while reducing the bending angle θ1 at the first bending line BL1 by setting the position of the inflection point P with respect to the suspension longitudinal direction in such a manner as to satisfy the condition of L5≦1.0*L3.

Described below is a result of an analysis performed on another example 4 regarding the first and second modified examples 1B, 1C.

Figure 11:
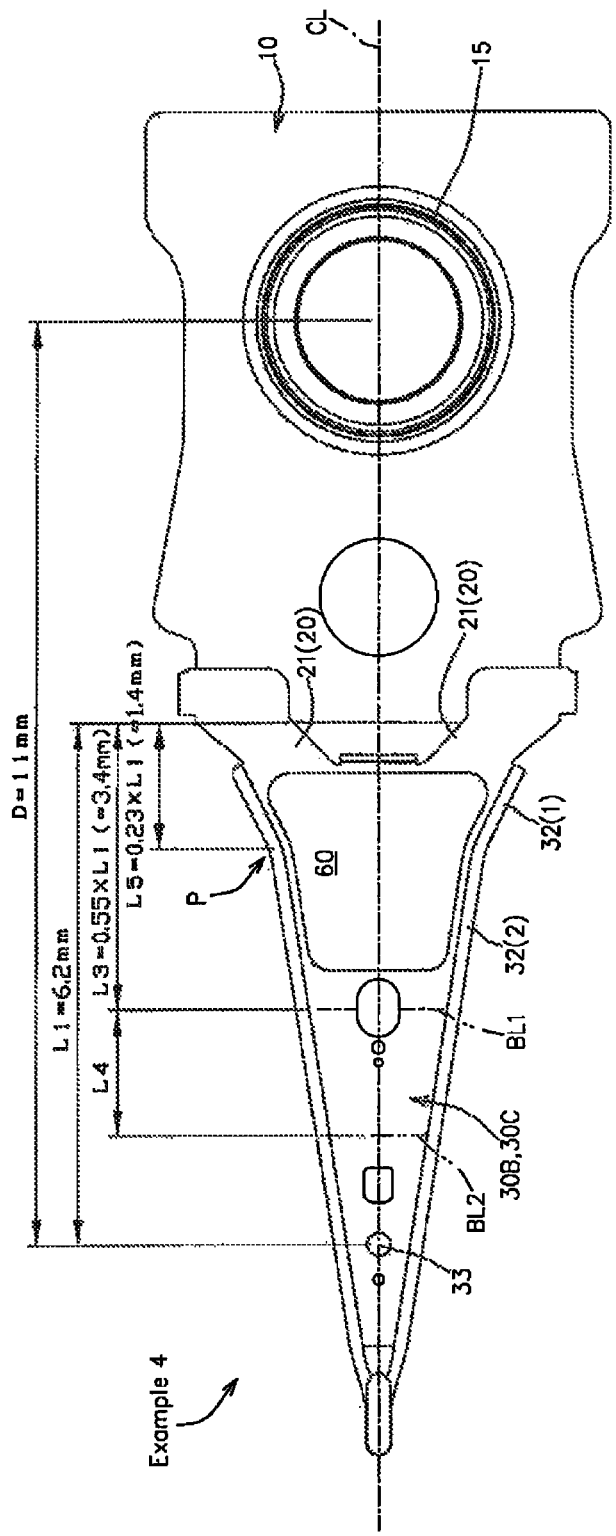
FIG. 11 is a top view of an example 4 regarding the first and second modified examples.

FIG. 11 is a plan view of the example 4.

The flexure part 40 is not shown in FIG. 11.

With respect to the example 4, prepared were a plurality of suspensions (hereinafter referred to as examples 4-1 to 4-4) in which lengths L4 between the distal edges of the supporting parts 10 and the second bending lines BL2 in the suspension longitudinal direction are different from one another in a state where the lengths L3 between the distal edges of the supporting parts 10 and the first bending lines BL1 in the suspension longitudinal direction were fixed to 0.55*L3 (=3.41 mm) and the lengths L5 between the inflection points P and the distal edges of the supporting parts 10 in the suspension longitudinal direction were fixed to 0.23*L1 (=1.4 mm).

More specifically, in the examples 4-1 to 4-4, the lengths L4 were set to 0.05*L1 (=0.31 mm), 0.12*L1 (=0.74 mm), 0.24*L1 (=1.5 mm) and 0.36*L1 (=2.2 mm), respectively.

The other dimensions of the examples 4-1 to 4-4 were same as those of the example 3.

On each of the examples 4-1 to 4-4, performed was the same analysis as in the example 3.

Figure 12:
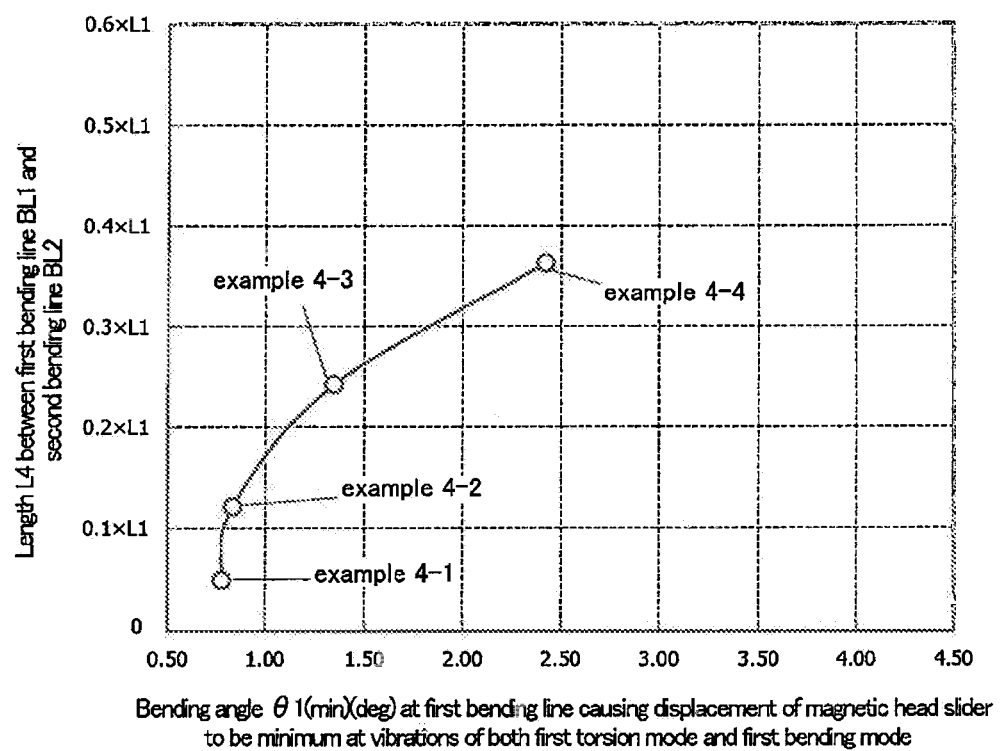
FIG. 12 is a graph of a result of an analysis made on the example 4, and shows a relationship of a length between the first and second bending lines relative to the bending angle at the first bending line for minimizing a displacement of the magnetic head slider at the time when the suspension is vibrated in a first bending mode as well as a displacement of the magnetic head slider at the time when the suspension is vibrated in a first torsion mode.

FIG. 12 shows a result of the analysis.

FIG. 12 shows that the bending angle θ1(min) becomes larger as the length L4 becomes longer in a case where the length L4 (the length between the second bending line BL2 and the first bending line BL1) exceeds 0.15*L1, but the bending angle θ1(min) is kept at a small value in a case where the length L4 is less than or equal to 0.15*L1.

It is understood from the fact that the displacement of the magnetic head slider can be minimized at the time of both the vibrations of the first torsion mode and the first bending mode by setting the position of the second bending line BL2 relative to the first bending line BL1 so as to satisfy the condition of L4≦0.15*L1.

Described below is a result of an analysis performed on still another example 5 regarding the first and second modified examples 1B, 1C.

Figure 13:
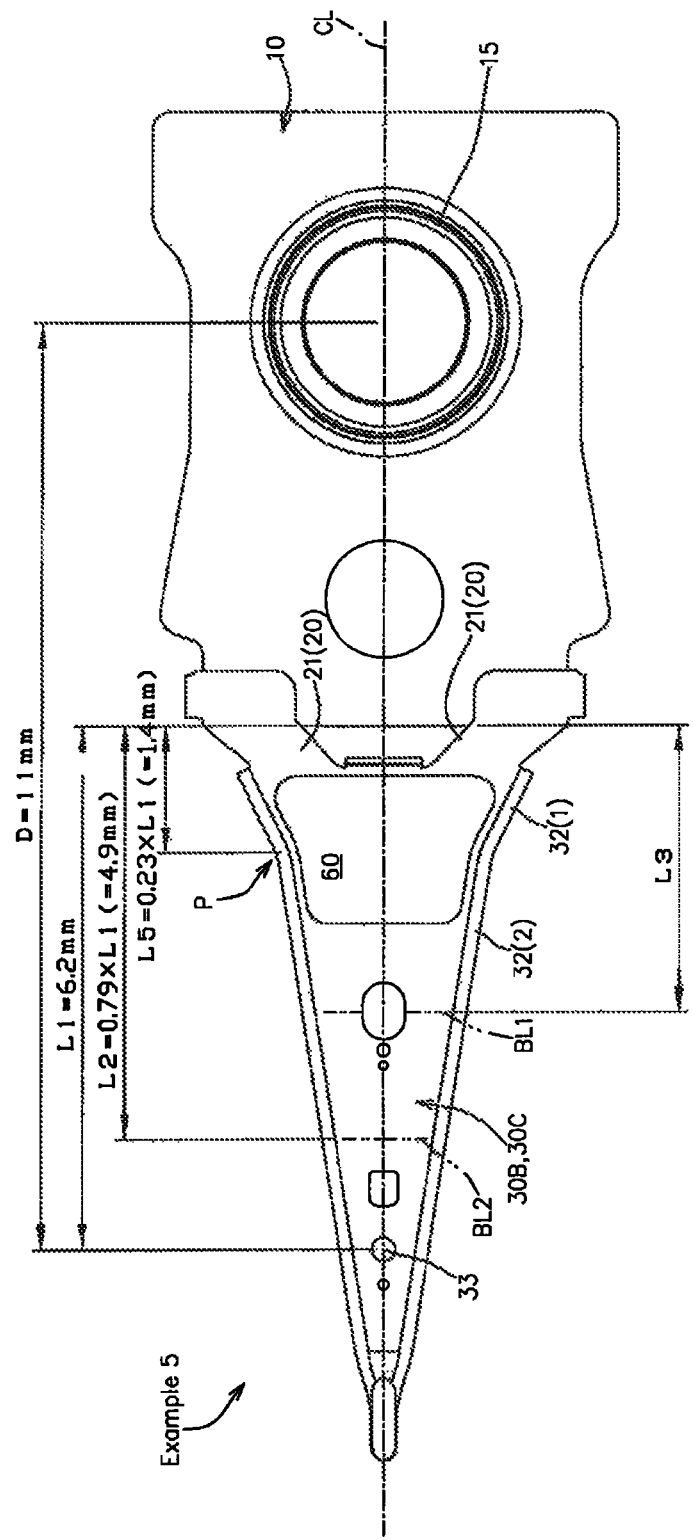
FIG. 13 is a top view of an example 5 regarding the first and second modified examples.

FIG. 13 is a plan view of the example 5.

The flexure part 40 is not shown in FIG. 13.

With respect to the example 5, prepared were a plurality of suspensions (hereinafter referred to as examples 5-1 to 5-4) in which lengths L3 between the distal edges of the supporting parts 10 and the first bending lines BL1 in the suspension longitudinal direction are different from one another in a state where the lengths L2 between the distal edges of the supporting parts 10 and the second bending lines BL2 in the suspension longitudinal direction were fixed to 0.79*L1 (=4.9 mm) and the lengths L5 between the inflection points P and the distal edges of the supporting parts 10 in the suspension longitudinal direction were fixed to 0.23*L1≦1.4 mm).

More specifically, in the examples 5-1 to 5-4, the lengths L3 were set to 0.73*L1 (=4.5 mm), 0.67*L1 (=4.2 mm), 0.55*L1 (=3.4 mm) and 0.43*L1 (=2.7 mm), respectively.

The other dimensions of the examples 5-1 to 5-4 were same as those of the example 3.

On each of the examples 5-1 to 5-4, performed was the same analysis as in the example 3.

Figure 14:
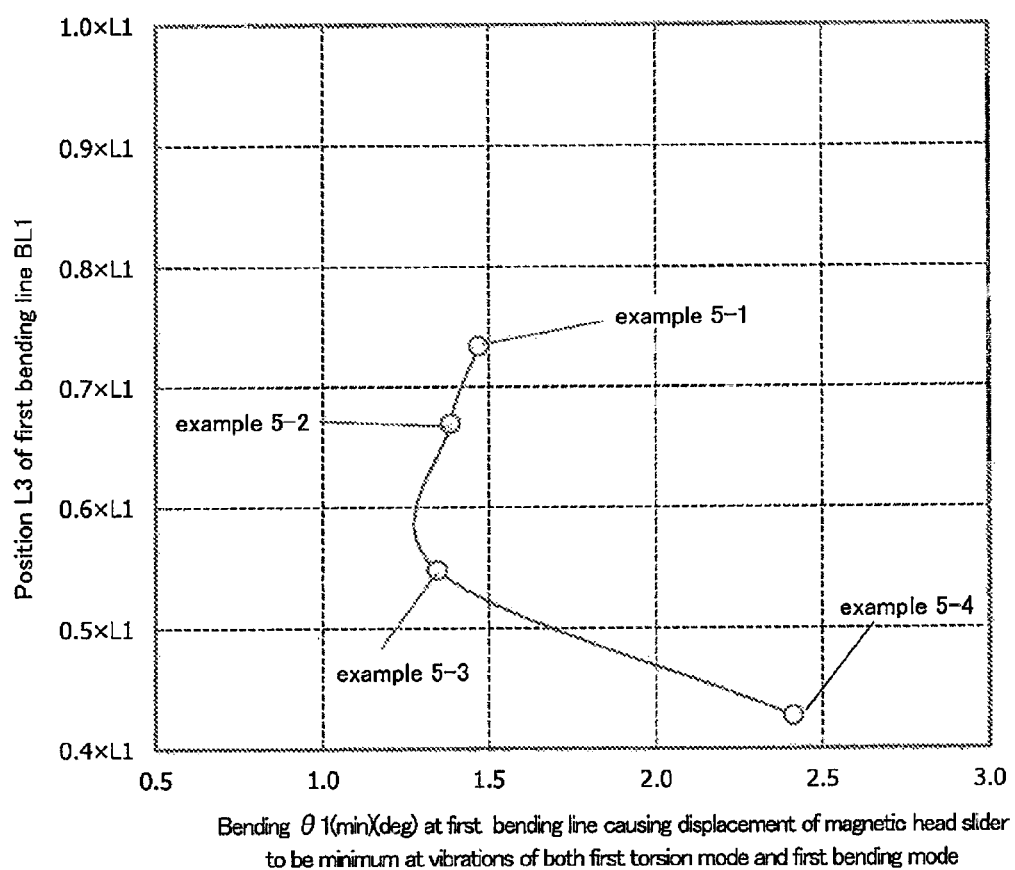
FIG. 14 is a graph of a result of an analysis made on the example 5, and shows a relationship of position of the first bending line relative to the bending angle at the first bending line for minimizing a displacement of the magnetic head slider at the time when the suspension is vibrated in a first bending mode as well as a displacement of the magnetic head slider at the time when the suspension is vibrated in a first torsion mode.

FIG. 14 shows a result of the analysis.

FIG. 14 shows that the bending angle θ1(min) can be reduced in a case where the condition of 0.53*L1≦L3≦0.67*L1 is satisfied.

From the fact, the first bending line BL1 can be preferably arranged so as to satisfy the condition of 0.53*L1≦L3≦0.67*L1.

What is claimed is:

1. A magnetic head suspension comprising a supporting part that is swung around a swing center in a seek direction parallel to a disk surface directly or indirectly by an actuator, a load bending part that is connected to the supporting part so as to generate a load for pressing a magnetic head slider toward the disk surface, a load beam part that is supported through the load bending part by the supporting part and transmits the load to the magnetic head slider, and a flexure part that is supported by the load beam part and the supporting part and has at a distal side a head-mounting region for supporting the magnetic head slider, wherein the load beam part includes a plate-like main body portion and paired flange portions, the main body portion facing the disk surface, the paired flange portions being bent from both side edges of the main body portion in a suspension width direction so as to extend toward a direction opposite from the disk surface, wherein the main body portion is provided with a dimple that protrudes in the direction toward the disk surface so as to come in contact with a reverse surface of the head-mounting region that is opposite from a supporting surface for supporting the magnetic head slider, and wherein the load beam part is bent at a first bending line in such a convex manner as to project in the direction to and the disk surface, and is bent at a second bending line in such a convex manner as to project in the direction toward the disk surface, the first bending line being positioned between a proximal end portion of the load beam part and the dimple in the suspension longitudinal direction and extending along the suspension width direction, the second bending line being positioned between the first bending line and the dimple in the suspension longitudinal direction and extending along the suspension width direction.

2. A magnetic head suspension according to claim 1, wherein the bending angles at the first and second bending lines are less than or equal to 3°.

3. A magnetic head suspension according to claim 1, wherein the paired flange portions are inclined so as to come closer to a suspension longitudinal center line as they go from a proximal side of the paired flange portions to a distal side of the paired flange portions.

4. A magnetic head suspension according to claim 3, wherein each of the paired flange portions includes a proximal end region and a distal end region, the proximal end region coming closer to the center line at a first inclination angle as it goes from a proximal side of the proximal end region to a distal side of the proximal end region, the distal end region extending toward the distal side of the paired flange portions from the proximal end region with an inflection point being sandwiched between them and coming closer to the center line at a second inclination angle, which is smaller than the first inclination angle, as it goes from a proximal side of the distal end region to a distal side of the distal end region.

5. A magnetic head suspension according to claim 4, wherein the inflection point is arranged at the same position as the first bending line or on a proximal side of the first bending line with respect to the suspension longitudinal direction.

6. A magnetic head suspension according to claim 1, further comprising a damper fixed on a surface of the main body portion that is opposite from the disk surface so as to be positioned on a proximal side of the first bending line.

7. A magnetic head suspension comprising a supporting part that is swung around a swing center in a seek direction parallel to a disk surface directly or indirectly by an actuator, a load bending part that is connected to the supporting part so as to generate a load for pressing a magnetic head slider toward the disk surface, a load beam part that is supported through the load bending part by the supporting part and transmits the load to the magnetic head slider, and a flexure part that is supported by the load beam part and the supporting part and has at a distal side a head-mounting region for supporting the magnetic head slider, wherein the load beam part includes a plate-like main body portion and paired flange portions, the main body portion facing the disk surface, the paired flange portions being bent from both side edges of the main body portion in a suspension width direction so as to extend toward a direction opposite from the disk surface, wherein the main body portion is provided with a dimple that protrudes in the direction toward the disk surface so as to come in contact with a reverse surface of the head-mounting region that is opposite from a supporting surface for supporting the magnetic head slider, wherein the load beam part is bent at first and second bending lines in such a convex manner as to project in the direction toward the disk surface, the first bending line being positioned between a proximal end portion of the load beam part and the dimple in the suspension longitudinal direction and extending along the suspension width direction, the second bending line being positioned between the first bending line and the dimple in the suspension longitudinal direction and extending along the suspension width direction, and wherein in a case where a length between a distal edge of the supporting part and the dimple in the suspension longitudinal direction is represented by $L1$, the position of the first bending line with respect to the suspension longitudinal direction is set in such a manner as that $L3$, which a length between the distal edge of the supporting part and the first bending line in the suspension longitudinal direction, satisfies a condition of $0.53*L1 \leqq L3 \leqq 0.67*L1$.

8. A magnetic head suspension comprising a supporting part that is swung around a swing center in a seek direction parallel to a disk surface directly or indirectly by an actuator, a load bending part that is connected to the supporting part so as to generate a load for pressing a magnetic head slider toward the disk surface, a load beam part that is supported through the load bending part by the supporting part and transmits the load to the magnetic head slider, and a flexure part that is supported by the load beam part and the supporting part and has at a distal side a head-mounting region for supporting the magnetic head slider, wherein the load beam part includes a plate-like main body portion and paired flange portions, the main body portion facing the disk surface, the paired flange portions being bent from both side edges of the main body portion in a suspension width direction so as to extend toward a direction opposite from the disk surface, wherein the main body portion is provided with a dimple that protrudes in the direction toward the disk surface so as to come in contact with a reverse surface of the head-mounting region that is opposite from a supporting surface for supporting the magnetic head slider, wherein the load beam part is bent at first and second bending lines in such a convex manner as to project in the direction toward the disk surface, the first bending line being positioned between a proximal end portion of the load beam part and the dimple in the suspension longitudinal direction and extending along the suspension width direction, the second bending line being positioned between the first bending line, and the dimple in the suspension longitudinal direction and extending along the suspension width direction, and wherein in a case where a length between a distal edge of the supporting part and the dimple in the suspension longitudinal direction is represented by $L1$, the position of the second bending line relative to the first bending line with respect to the suspension, longitudinal direction is set in such a manner as that $L4$, which is a length between the first bending line and the second bending line in the suspension longitudinal direction, satisfies a condition of $L4 \leqq 0.15*L1$.

* * * * *

UNITED STATES PATENT AND TRADEMARK OFFICE
CERTIFICATE OF CORRECTION

| | |
|---|---|
| PATENT NO. | : 8,472,144 B2 |
| APPLICATION NO. | : 13/286540 |
| DATED | : June 25, 2013 |
| INVENTOR(S) | : Yasuo Fujimoto |

It is certified that error appears in the above-identified patent and that said Letters Patent is hereby corrected as shown below:

In the Claims

In column 18, line 32, "to and" should be --toward--.

Signed and Sealed this
Tenth Day of September, 2013

Teresa Stanek Rea
*Acting Director of the United States Patent and Trademark Office*